Jan. 21, 1969  C. J. ECKENROTH  3,423,276
DECORATIVE COVERING FOR DASHBOARD PANELS AND
METHOD OF APPLYING SAME
Filed Sept. 13, 1965
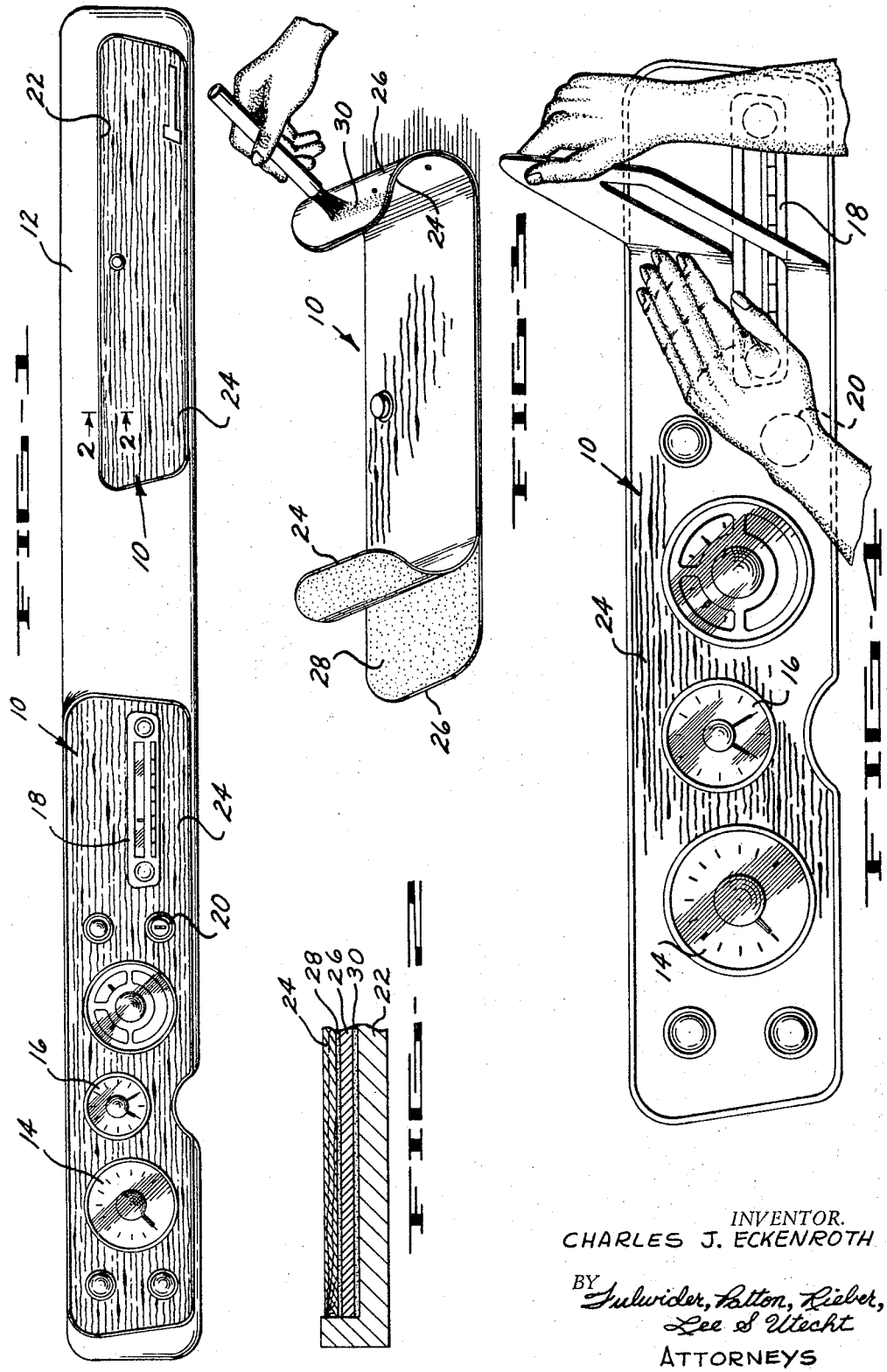
INVENTOR.
CHARLES J. ECKENROTH
BY
ATTORNEYS

United States Patent Office 3,423,276
Patented Jan. 21, 1969

3,423,276
DECORATIVE COVERING FOR DASHBOARD
PANELS AND METHOD OF APPLYING SAME
Charles J. Eckenroth, 506 E. Las Tunas Drive,
San Gabriel, Calif. 91776
Filed Sept. 13, 1965, Ser. No. 486,604
U.S. Cl. 161—39         2 Claims
Int. Cl. B32b 33/00, 3/10

ABSTRACT OF THE DISCLOSURE

A decorative covering for dashboard panels and the like formed of a thin sheet of decorative wood paneling material backed by a thin, porous reinforcing sheet, with the back of the latter bearing a pressure-sensitive adhesive to adhere the sheets to a panel.

---

The present invention relates to decorative paneling and more particularly to a decorative covering for customizing dashboards panels and the like.

In most automotive vehicles, boats, and airplanes, the instrument or dashboard panels are formed of a painted metal or plastic material. It is only the most expensive vehicles which include wood paneling for the dashboards and other interior panel strips. Wood paneling adds greatly to the elegant and luxurious appearance of the interior of the vehicle. Unfortunately, it is also very expensive, particularly as a custom item for the more inexpensive vehicles.

Accordingly, it is an object of the present invention to provide means for inexpensively customizing the panels of dashboards and the like with a decorative covering, preferably a wood material.

Another object of the present invention is to provide an inexpensive decorative covering which may be easily and rapidly applied to dashboards and the like.

A further object of the present invention is to provide novel methods of producing covering of the foregoing character and of applying the coverings to dashboard panels and the like.

The foregoing as well as other objects and advantages of the present invention may be more clearly understood by reference to the following detailed description when taken with the drawing which, by way of example only, illustrates one form of decorative covering for an automobile dashboard panel including the features of the present invention.

In the drawing:

FIGURE 1 is a front view of a dashboard panel including the decorative covering;

FIGURE 2 is a magnified sectional view taken along the line 2—2 in FIGURE 1;

FIGURE 3 is a perspective view illustrating a sheet of the decorative covering including a reinforcing backing sheet, peeled back to show its manner of connection and an adhesive being applied to the back of the reinforcing sheet; and FIGURE 4 is a front view illustrating the manner of attaching the decorative covering to the dashboard panel.

In the drawing, the decorative covering is represented generally by the numeral 10 and in FIGURE 1 is illustrated as covering a conventional automobile dashboard panel 12 including mountings for a speedometer 14, clock 16, radio 18 and ignition switch 20. The decorative covering 10 also covers a door 22 of the glove compartment included in the dashboard panel 12.

As illustrated most clearly in FIGURES 2 and 3, the decorative covering 10 comprises a thin, flexible sheet 24 of a decorative paneling material such as a wood, vinyl plastic imitation wood, metal-flaked plastic sheet, or other thin, paneling material. Preferably, the decorative sheet 24 is a flatcut sheet of wood such as a walnut, approximately 1/86 inch thick.

If the decorative sheet 24 is formed of a wood, it is preferably hand rubbed with a finishing or clear oil to bring out its grain pattern and to produce a long lasting look of elegance. If desired, a wax finish may be added over the outer surface of the decorative sheet and for boats a weather-resistant finish may be provided.

After the decorative sheet 24 is formed, generally by cutting from a larger plank of wood, the back thereof is preferably covered by thin, reinforcing sheet 26 of a slightly porous, flexible, backing material such as a cloth or a cloth-paper combination. As illustrated most clearly in FIGURES 2 and 3, the reinforcing sheet 26 is preferably connected to the back of the decorative sheet 24 by a pressure sensitive adhesive 28 to form a tight bond between the reinforcing sheet and decorative sheet.

The decorative covering 10 formed by the combination of the decorative sheet 24 and the reinforcing sheet 26, is strong, somewhat resilient, tear resistant, and adapted to follow and fit to the contour of different shaped panels and panel surfaces. In this regard, after the reinforcing sheet 26 has joined to the decorative sheet 24, the decorative covering 10 is cut to conform to the size and shape of the panel to which it is to be attached. If the covering 10 is to cover a dashboard, access holes are cut through the decorative and reinforcing sheets to allow the covering to closely fit around instrument mountings on the dashboard panel.

Various means may be employed to secure the decorative covering 10 to a panel. Preferably, however, this is accomplished by applying a pressure-sensitive adhesive 30 to the back of the reinforcing sheet 26 (see FIGURE 3) and then pressing the covering 10 firmly against the panel, as illustrated in FIGURE 4, to connect the covering to the panel.

After once being secured to the panel, the covering 10 provides a permanent, weather-resistant, decorative cover for the panel and in the case of decorative sheets 24 of wood or imitation wood adds a customized touch of elegance to the interior of any vehicle. Because of the simplicity of the present invention, the touch of elegance may be added at a low cost and may be achieved simply by applying an adhesive to the back of the covering 10 and pressing the covering against the panel to be covered.

While in the foregoing, a particular form of decorative covering, together with its mode of manufacture and method of application, has been described in some detail, changes may occur to those skilled in the art without departing from the spirit of the present invention. It is therefor intended that the present invention be limited in scope allowed by the terms of the following claims.

I claim:
1. A decorative covering for dashboard panels and the like, comprising:
    a thin decorative sheet of wood paneling material adapted to fit over a panel to be covered and including openings for fitting around instrument mountings on said panel;
    a thin reinforcing sheet of porous material bonded to the back of said decorative sheet;
    and a pressure-sensitive adhesive coated over the back of said reinforcing sheet for adhering the laminated combination of said decorative and reinforcing sheets to said panel.

2. A method of covering a dashboard panel or the like, comprising the steps of:

forming a thin, flexible decorative sheet of wood paneling material;

adhering said decorative sheets to a reinforcing sheet;

cutting the laminated combination of said decorative and reinforcing sheets to fit over a dashboard panel or the like to be covered and around the instrument mountings on said panel;

applying a pressure-sensitive adhesive to the back of said reinforcing sheet;

and pressing said laminated combination onto said panel.

References Cited

UNITED STATES PATENTS

| 2,057,873 | 10/1936 | Atwood | 161—167 X |
| 2,073,844 | 3/1937 | Lowenfels | 161—39 |
| 2,603,899 | 7/1952 | Leander | 161—406 |
| 2,626,226 | 1/1953 | Adair | 161—39 X |
| 3,130,113 | 4/1964 | Silman | 161—167 X |
| 3,329,331 | 7/1967 | Morgan | 161—406 X |

HAROLD ANSHER, *Primary Examiner.*

U.S. Cl. X.R.

156—71, 256, 299; 161—56, 109, 167, 413